Sept. 6, 1966  R. E. PINTO  3,270,842
CAM OPERATED CLUTCHES FOR LAWN MOWER
Filed March 27, 1964  2 Sheets-Sheet 1
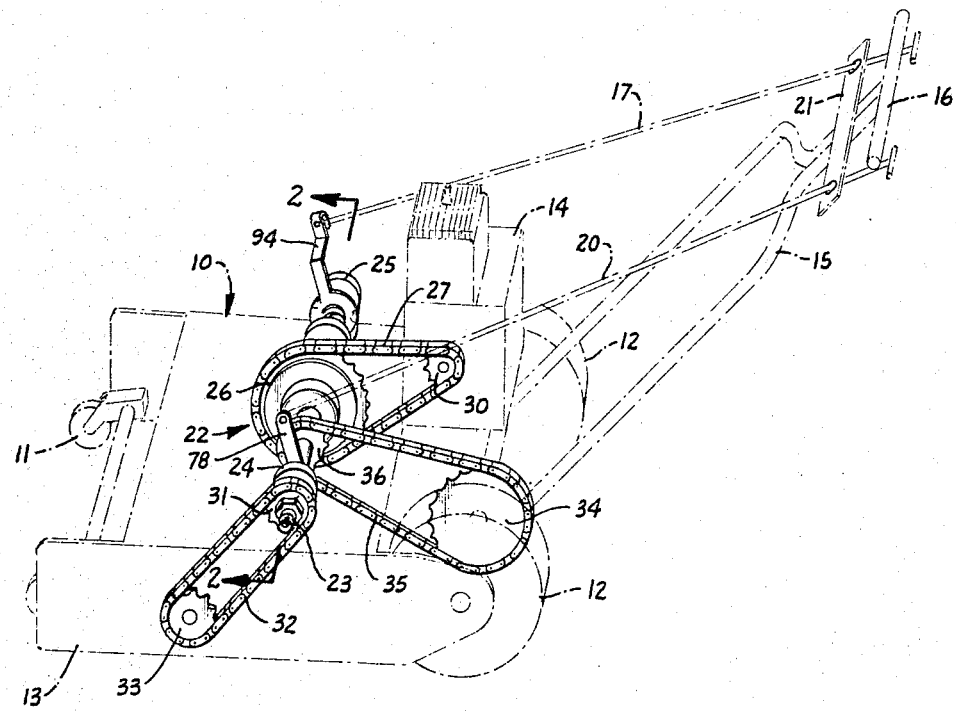
FIG. 1.
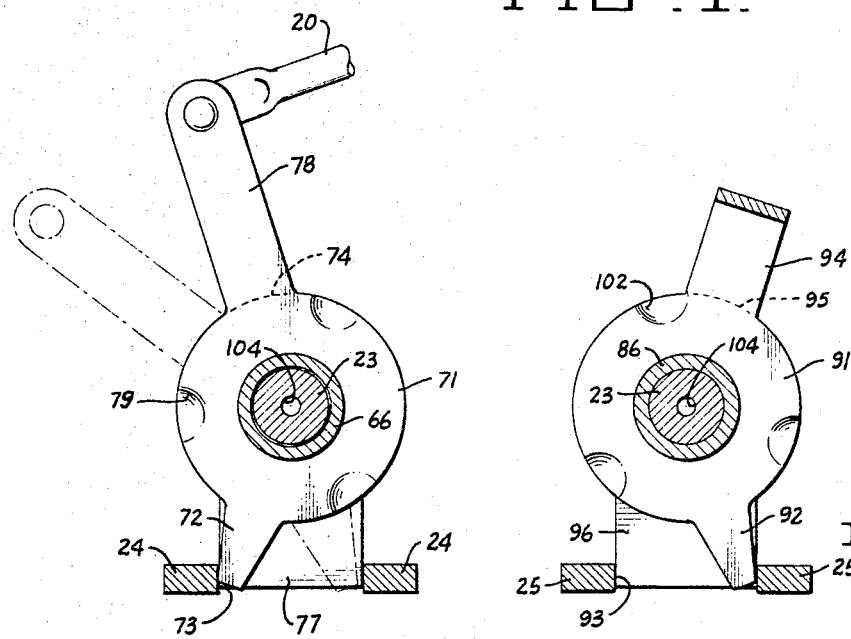
FIG. 3.  FIG. 4.
INVENTOR.
ROSS E. PINTO
BY 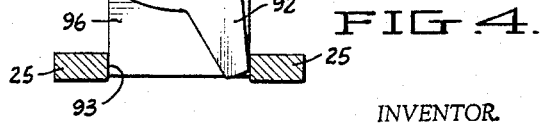
ATTORNEYS

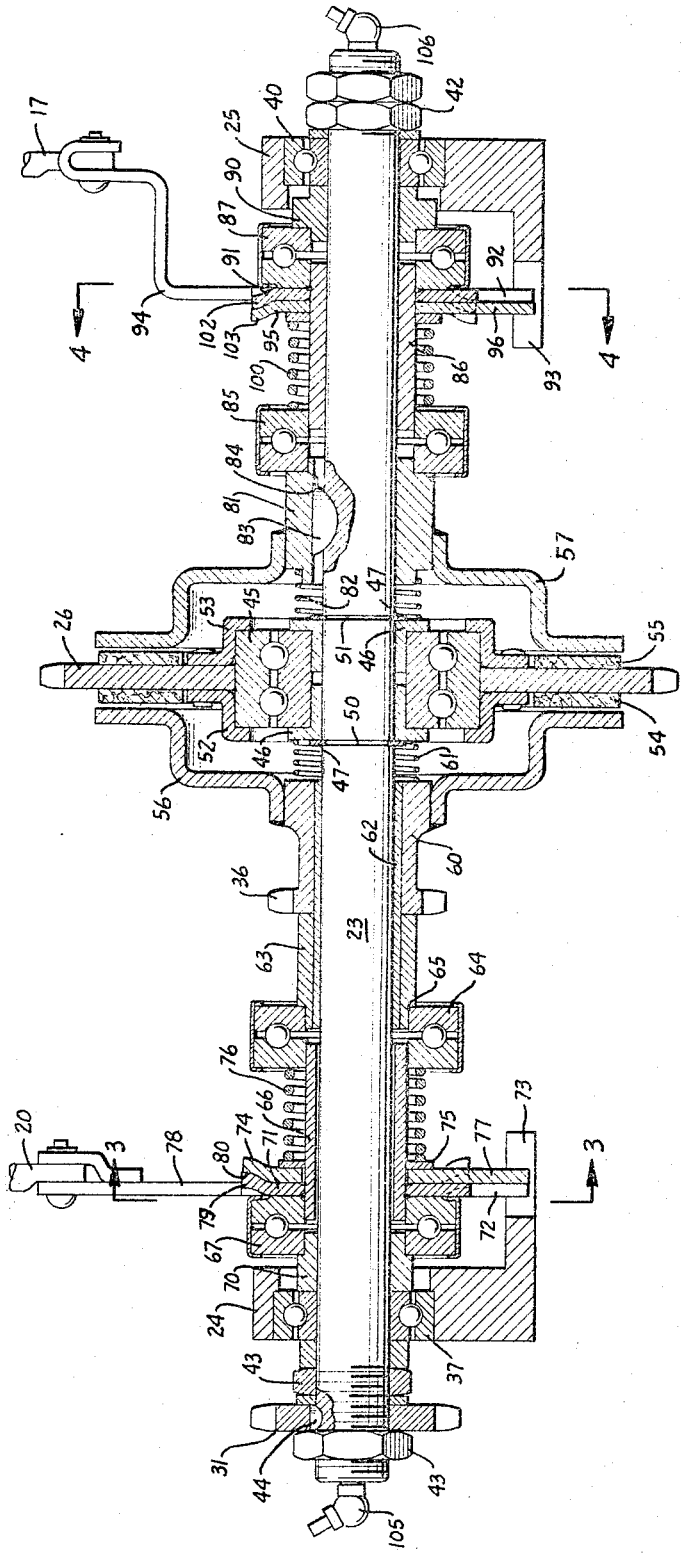

United States Patent Office 3,270,842
Patented Sept. 6, 1966

3,270,842
CAM OPERATED CLUTCHES FOR LAWN MOWER
Ross E. Pinto, Torrance, Calif., assignor to Roman Industries, Los Angeles, Calif., a corporation of California
Filed Mar. 27, 1964, Ser. No. 355,268
1 Claim. (Cl. 192—48)

The present invention relates to power driven mowers and is more particularly directed to an improved driving clutch arrangement for such mowers wherein drive power may be selectively transmitted to the mower moving and cutting elements.

In present lawn mower drive arrangements, it is known to mount a main drive element, in the form of a sprocket or gear, on a main clutch shaft and to also mount on this shaft clutch disk members which are selectively engageable with the drive element. The clutch disks in such arrangements are typically forced into engagement with the drive element through means of some type of mechanism spaced laterally of the clutch shaft and adapted to extend into engagement with the clutch disks. These mechanisms have the disadvantage that the components extending into engagement with the clutch disks are relatively long and subject to high stresses and resultant damage. In addition, since forces are imparted from the clutch actuating mechanism to the components on the main clutch shaft, it is necessary that both the shaft and mechanism be provided with adequate structure to withstand these forces. Arrangements of this type have the added resultant disadvantage that the main clutch shaft structure and the clutch actuating mechanism spaced therefrom occupy a considerable area.

It is, accordingly, a principal object of the present invention to provide a mower drive arrangement overcoming the disadvantages, such as those enumerated above, of present drive arrangements.

The objects of the invention are acocmplished in a construction wherein the clutch plates and clutch actuating components are carried on a single main clutch shaft, which shaft also carries the driven element with which the clutch plates are engageable. The driven element, clutch plates and the clutch actuating components are so arranged on the clutch shaft that forces imparted to engage the clutch plates are applied axially to the shaft equally in opposite directions. Thus, it is not necessary that supports to withstand the forces imparted to the clutch plates be provided for either the shaft or clutch actuating components. The main clutch shaft, in addition to supporting the drive element and the clutch plates and actuating components, also supports driven elements which function to transmit power from the clutch plates to the driven lawn mower components, such as the reel and driving wheels.

The foregoing and other objects and the detailed structure of the subject invention will become more apparent when viewed in light of the accompanying drawings, wherein:

FIG. 1 illustrates a perspective view of a lawn mower with the inventive construction shown in solid lines and the conventional lawn mower structure shown in phantom lines;

FIG. 2 is a cross sectional elevation view illustrating the inventive construction, taken on line 2—2 of FIG. 1;

FIGS. 3 and 4 are cross sectional views taken on lines 3—3 and 4—4, respectively, of FIG. 2.

Referring now to FIG. 1, therein is illustrated a lawn mower 10 provided with forward and rearward supporting wheels 11 and 12, respectively, the latter of which are driven. Of conventional nature, the lawn mower 10 also includes a carriage 13 having an engine 14 supported on the upper surface thereof and a handle bar 15 extending rearwardly therefrom. A grip 16 is fixed to the upper end of the handle bar 15 and has extending downwardly therefrom control rods 17 and 20 which are slidably supported on the handle bar 15 by a transverse bracket 21. The lower ends of the rods 17 and 20 are secured to the clutch construction of the present invention, designated in its entirety by the numeral 22.

The clutch construction 22, as will be developed in detail subsequently with respect to FIGS. 2, 3 and 4, includes a clutch shaft 23 extending transversely across the carriage 13 and supported thereon by mounting brackets 24 and 25. A main drive sprocket 26 is rotatably mounted on the center portion of the shaft 23 and is driven through a chain 27 extending therebetween and a sprocket 30 fixd to the crankshaft of the engine 14. A driven sprocket 31 is fixed to the end of the shaft 23 and has engaged thereon a chain 32 extending into driving engagement with a sprocket 33 which is fixed to the end of the lawn mower reel (not illustrated). Driving power is imparted to the wheels 12 through means of a driven sprocket 34 fixed to an axle shaft (not illustrated) extending between the wheels. A chain 35 operatively engages the sprocket 34 and extends into engagement with a sprocket 36 rotatably received on the shaft 23.

Referring now to the detailed clutch construction illustrated in FIG. 2, the shaft 22 is shown therein rotatably supported in the brackets 24 and 25 by ball bearings 37 and 40, respectively. The shaft 23 is held against axial movement within the brackets 24 and 25 by pairs of nuts 42 and 43 threaded onto the opposite ends thereof. Suitable spacers ar provided between the nuts and the bearings 37 and 40 and the sprocket 31 is also interposed between the nuts 43. A key 44 locks the sprocket 31 to the shaft 23 for rotational movement therewith.

The drive sprocket 26 is rotatably supported on the shaft 23 by a ball bearing 45 which is held against axial movement by a pair of collars 46 and a pair of snap rings 47, the latter of which are engaged in annular grooves 50 and 51 formed in the shaft. The sprocket 26 is secured to the ball bearing 45 by annular brackets 52 and 53 and has secured to the opposite sides thereof, as by bonding, annular clutch facings 54 and 55. From the manner in which the sprocket 26 is held on the shaft 23, it can be seen that lateral forces applied to either of the faces 54 or 55 will be transmitted directly to the shaft as axial forces.

The shaft 23 further carries thereon clutch plates 56 and 57 on opposite sides of the drive sprockets 26. The plate 56 is supported on shaft 23 for both axial and rotational movement with respect thereto by a sleeve 60. One end of the sleeve 60 has formed thereon the sprocket 36 and the other end is fixedly secured to the plate 56, as by welding. A coil spring 61 is interposed between the sleeve 60 and the collar 46 adjacent thereto in order to normally urge the clutch plate 56 to disengaged position with respect to the clutch facings 54 (as illustrated in FIG. 2). A sleeve bearing 62 is held within the sleeve 60 and a spacer 63 juxtaposed thereto and facilitates both rotational and axial movement of these elements on the shaft 23.

The engaging mechanism for the clutch plate 56 includes a ball bearing type thrust bearing 64 juxtaposed on one side to a shoulder 65 formed in the spacer 63. The other side of the bearing 64 is slidably received on a sleeve 63. The sleeve 66 extends along the shaft 23 to sliding engagement with a thrust bearing 67 which is held on the shaft 23 in spaced relationship to the mounting bracket 24 by a spacer 70. An annular cam actuating plate 71 is fixed to the sleeve 66, as by welding, in juxtaposition to the thrust bearing 67 whereby it is held on the shaft 23 against axial movement. The plate 71 has fixed to and extending from one side thereof a finger 72 which extends into a slot 73 in the bracket 24 for limiting swinging movement about the shaft 23. A lever 78 is also fixed to the plate 71 and extends therefrom into pivotal engagement with the aforedscribed control rod 20. The engaging mechanism for the clutch plate 56 is completed by an annular cam plate 74 and washer 75, respectively, received on the sleeve 66 for slidable and rotational movement and a coil spring 76 interposed between said washer and the thrust bearing 64. The plate 74 has fixed to and extending therefrom a finger 77 which is snugly received within the slot 73 of the mounting bracket 24 to prevent rotational movement between said bracket and plate.

The detailed structure and operation of the annular plates or disks 71 and 74 is also illustrated in FIG. 3. From the solid and phantom line representations of this figure, it can be seen that the interrelationship between the finger 72 and the slot 73 permits limited swinging of the plate 71 about the shaft 23. It can also be seen that rotational movement of the plate 74 about the axis of the shaft 23 is completely restricted by the interengagement between the finger 77 and slot 73.

Operation of the engaging mechanism for the clutch plate 56 is facilitated by a plurality of protrusions 79 extending from the side of the plate 71 in juxtaposition to the plate 74 and a plurality of mating recesses 80 formed in the latter plate. In the seated condition illustrated in FIG. 2, the protrusions and recesses 79 and 80, respectively, facilitate retractions of the clutch plate 56 to the disengaged position. Turning of the actuating plate 71 with respect to the cam plate 74, as illustrated by the phantom lines of FIG. 3, functions to bring the protrusions 79 out of mating engagement with the recesses 80, thus forcing the cam plate 74 axially along the shaft 23 towards the drive sprocket 26. The latter movement of the plate 74 is transmitted directly to the clutch plate 56 through the spring 76, thrust bearing 74, spacer 73 and sleeve 60. As a result, the plate 56 is forced into driving engagement with the sprocket 26 and rotational movement of the sprocket 26 is imparted to the driven sprocket 36 and the chain 35 engaged thereon (see FIG. 1). Thus, pushing or pulling on the control rod 20 functions to control the transmission of power to the drive wheels 12 of the mower 10. The arrangement of the plates 71 and 74 is particularly advantageous, since all forces imparted therethrough are transmitted to the clutch shaft 23 axially as equal and opposite forces (i.e., axial forces on the plate 71 are transmitted to the nuts 43 and axial forces on the plate 74 are transmitted to the groove 51).

Referring now to the mounting arrangement of the clutch plate 57, this plate is slidably mounted on the shaft 23 for axial movement by a sleeve 81 and is resiliently biased away from the sprocket 26 by a spring 82 interposed between the sleeve and the adjacent collar 46. A key 83 is held fixedly in the shaft 23 and slidably received in a keyway 84 in the sleeve 81 to prevent rotational movement between the shaft and sleeve. Thus, rotational movement imparted to the sleeve 81 through the clutch plate 57 will be transmitted through the shaft 23 and to the sprocket 31.

The engaging mechanism for the clutch plate 57 corresponds substantially to the aforedescribed mechanism for the plate 56. Included in this mechanism is a thrust bearing 85 fixedly received on one side on a shoulder of the sleeve 81 and slidably received on the other side on a sleeve or bushing 86 rotatable on the shaft 23. The end of the sleeve 86 remote from the bearing 85 has slidably received thereon a thrust bearing 87 which is held in spaced relationship with respect to the bracket 25 by a spacer 90. A cam actuating plate 91, corresponding substantially to the aforementioned plate 71, is fixed to the sleeve 86, as by welding, and has extending from one side thereof a finger 92 which is received within a slot 93 in the bracket 25 for limited swinging movement. The plate 91 also has fixed thereto and extending radially therefrom a lever 94 pivotally secured at the free end thereof to the control rod 17. An annular cam plate 95, corresponding substantially to the plate 75, is slidably received on the sleeve 86 in juxtaposition to the plate 91 and has extending laterally therefrom a finger 96 snugly received within the slot 93. The interrelationship between the fingers 92 and 96 and the slot 93 is clearly illustrated in FIG. 4. The engaging mechanism for the clutch plate 57 is completed by a washer 97 slidably received on the sleeve 86 and a coil spring 100 interposed between said washer and the thrust bearing 85.

The operation of the plates 91 and 95 in engaging the clutch plate 57 corresponds substantially to that of the aforedescribed plate 71 and 77. This operation is facilitated by protrusions 102 extending from the plate 91 and mating recesses 103 formed in the plate 95. In the mating condition illustrated in FIG. 2, the protrusions and recesses 102 and 103, respectively, permit the clutch plate 57 to assume the retracted position. However, upon turning of the plate 91 with respect to the plate 95, the later plate is forced towards the drive sprocket 26 and the clutch plate 57 is, in turn, forced into engagement with the clutch facings 54. Thus, it can be seen that pushing and pulling of the control rod 17 functions to either engage or disengage the clutch plate 57. Engagement of the clutch plate 57 functions to impart rotational movement to the shaft 23 through the key 83, resulting in the transmission of rotary movement to the sprocket 31. The latter movement is transmitted to the cutting reel of the lawn mower through the chain 32 and sprocket 33 (see FIG. 1). The operation of the plates 91 and 95 corresponds to that of the aforedescribed plates 71 and 74 in that forces applied through the plates are transmitted axially to the shaft 23 as equal forces acting in opposite directions. Specifically, forces applied to the plate 91 are transmitted to the nuts 42 and forces applied to the plate 95 are transmitted to the groove 50.

The foregoing clutch construction also has the advantage that all of the rotary bearing components thereof may be easily and readily lubricated. Lubrication is facilitated by a passage 104 (see FIGS. 3 and 4) extending axially through the shaft 23 and having on the ends thereof grease fittings 105 and 106. Although not illustrated, it is to be understood that the passage 104 communicates with the bearings received on the shaft 23 through suitable grease ducts.

To conclude, from the foregoing detailed description it is believed apparent that the present invention enables the accomplishment of the objects initially set forth herein. In particular, an improved clutch construction is provided wherein thrust imparted to engage the clutch is axial on the clutch shaft and equal in opposite directions. Thus, this thrust is not transmitted to the clutch shaft support members or to the levers used to actuate the clutch. It is to be understood, however, that the invention is not intended to be limited to the specific embodiment illustrated and described, but rather is defined by the following claims.

What is claimed is:

In a dual clutch construction for a lawn mower, comprising:
  (a) a clutch shaft rotatably supported on the lawn mower and having first mower drive means fixed thereto;
  (b) an annular driven element co-axially received on said shaft;
  (c) main radial and thrust bearing means mounting said element on said shaft for rotation relative thereto in a plane substantially fixed and normal relative thereto;
  (d) a first annular clutch element co-axially received on and keyed to said shaft to one side of said driven element for axial movement and against rotational movement relative to said shaft, said first clutch element being frictionally engageable with one side of said driven element upon axial movement thereagainst;

(e) a second annular clutch element, having second mower drive means fixed thereto, co-axially received on said shaft to the other side of said driven element for axial and rotational movement relative to said shaft, said second clutch element being frictionally engageable with one side of said driven element upon axial movement thereagainst;

an improved means for selectively engaging either one or simultaneously engaging both of said clutch elements with said driven element, comprising:

(1) first and second annular cam disks rotatably received around said clutch shaft, respectively, to either side of said driven element for axial movement on said shaft towards and away from said driven element;

(2) first and second thrust bearing means interposed, respectively, between said first clutch element and cam disk and said second clutch element and cam disk;

(3) first and second resilient compression means interposed, respectively, between said first thrust bearing means and cam disk and said second thrust bearing means and cam disk to resiliently urge said respective thrust bearing means and cam disks apart whereby movement of said first and second cam disks towards said driven element functions, respectively, to resiliently urge said first and second clutch elements into frictional engagement with said driven element;

(4) first and second annular cam actuating disks rotatably received around said clutch shaft with one side thereof in juxtaposition to one side of the respective first and second cam disks exteriorly relative to said driven element;

(5) first and second abutment elements fixed to said clutch shaft to either side of said driven element exteriorly relative to said respective first and second cam actuating disks;

(6) first and second bearing means interposed, respectively, between said first cam actuating disk and abutment element and said second cam actuating disk and abutment element to provide, with said abutment elements for the rotatable receipt of said cam actuating disks on said shaft and the maintenance of said cam actuating disks against axial movement on said shaft away from said driven element;

(7) mating recesses and protrusions on the juxtaposed sides of the cam disks and cam actuating disks, said recesses being adapted to be brought into and out of mating engagement by rotation of the cam actuating disks relative to the cam disks;

(8) means to simultaneously or independently selectively impart relative rotation to the juxtaposed cam actuating and cam disks; and wherein, (9) relative rotation of the juxtaposed cam actuating and cam disks functions to move the cam disks axially on the clutch shaft towards said driven element.

References Cited by the Examiner

UNITED STATES PATENTS

| | | | |
|---|---|---|---|
| 787,072 | 4/1905 | Brush | 192—93 |
| 789,615 | 5/1905 | Le Grand | 192—93 |
| 1,307,954 | 6/1919 | Bowman | 192—93 |
| 1,627,858 | 5/1927 | Morgal | 192—93 |
| 2,848,086 | 8/1958 | Warsaw | 192—93 |
| 2,881,887 | 4/1959 | Faas | 192—48 |

DAVID J. WILLIAMOWSKY, *Primary Examiner.*

DON A. WAITE, *Examiner.*

B. W. WYCHE III, *Assistant Examiner.*